US012087157B2

United States Patent
Reimann et al.

(10) Patent No.: US 12,087,157 B2
(45) Date of Patent: Sep. 10, 2024

(54) VEHICLE, METHOD, COMPUTER PROGRAM AND DEVICE FOR MERGING OBJECT INFORMATION ABOUT ONE OR MORE OBJECTS IN THE SURROUNDINGS OF A VEHICLE

(71) Applicant: VOLKSWAGEN AKTIENGESELLSCHAFT, Wolfsburg (DE)

(72) Inventors: Daniel Reimann, Braunschweig (DE); Niklas Puller, Braunschweig (DE); Oliver Trauer, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 240 days.

(21) Appl. No.: 17/334,907

(22) Filed: May 31, 2021

(65) Prior Publication Data

US 2021/0383689 A1    Dec. 9, 2021

(30) Foreign Application Priority Data

Jun. 5, 2020   (DE) .................... 10 2020 207 065.2

(51) Int. Cl.
  *G08G 1/048* (2006.01)
  *H04W 4/40* (2018.01)
(52) U.S. Cl.
  CPC .............. *G08G 1/048* (2013.01); *H04W 4/40* (2018.02)
(58) Field of Classification Search
  CPC ................................ G08G 1/048; H04W 4/40
  (Continued)

(56) References Cited

U.S. PATENT DOCUMENTS

| 9,183,463 B2 | 11/2015 | Steinhardt |
| 2010/0198513 A1 | 8/2010 | Zeng et al. |

(Continued)

FOREIGN PATENT DOCUMENTS

| CN | 104217615 A | 12/2014 |
| CN | 105513391 A | 4/2016 |

(Continued)

OTHER PUBLICATIONS

Office Action; Chinese Patent Application No. 202110623849.4; Aug. 3, 2022.

(Continued)

*Primary Examiner* — Krishnan Ramesh
(74) *Attorney, Agent, or Firm* — Barnes & Thornburg LLP

(57) ABSTRACT

A transportation vehicle, a method, a computer program and an apparatus for combining object information relating to one or more objects in an environment of a transportation vehicle from different data sources. The method includes capturing a first item of environmental information relating to the environment by at least one sensor arranged on the transportation vehicle, receiving at least one second item of environmental information relating to the environment from a transmitter separated from the transportation vehicle, determining at least one first item of object information from the first environmental information, determining at least one second item of object information from the second environmental information, and assigning the first meta information and the second meta information to one another based on a comparison of a tolerance range with a discrepancy between the first object information and the second object information.

14 Claims, 6 Drawing Sheets

(58) Field of Classification Search
USPC .......................................................... 701/117
See application file for complete search history.

(56) References Cited

U.S. PATENT DOCUMENTS

| | | | |
|---|---|---|---|
| 2014/0020098 A1 | 1/2014 | Stahlin | |
| 2015/0127249 A1 | 5/2015 | Strauss et al. | |
| 2015/0166071 A1 | 6/2015 | Komar et al. | |
| 2017/0109007 A1* | 4/2017 | Hurter | G08G 5/0026 |
| 2018/0090009 A1 | 3/2018 | Roessler et al. | |
| 2019/0049986 A1* | 2/2019 | Georges | G01S 17/931 |
| 2019/0113916 A1* | 4/2019 | Guo | A61B 5/6893 |
| 2019/0378412 A1 | 12/2019 | Zhu | |
| 2020/0033153 A1* | 1/2020 | Schneider | G01C 21/3602 |
| 2020/0184235 A1* | 6/2020 | Kwon | G06F 18/22 |
| 2021/0056770 A1 | 2/2021 | Moradi Pari | |
| 2021/0061306 A1* | 3/2021 | Dagan | B60W 60/0013 |
| 2021/0086764 A1 | 3/2021 | Zhang et al. | |
| 2021/0152991 A1 | 5/2021 | Wu et al. | |
| 2021/0221398 A1* | 7/2021 | Korobkin | G06V 20/56 |
| 2021/0225152 A1* | 7/2021 | Taylor | B60H 1/00742 |
| 2021/0237761 A1* | 8/2021 | Das | G01S 13/89 |
| 2021/0263525 A1* | 8/2021 | Das | G06V 20/58 |
| 2021/0300356 A1* | 9/2021 | Paudel | G01C 21/3461 |
| 2022/0365991 A1* | 11/2022 | Lenke | G06F 16/2379 |

FOREIGN PATENT DOCUMENTS

| | | |
|---|---|---|
| CN | 105741546 A | 7/2016 |
| CN | 108284838 A | 7/2018 |
| CN | 109920246 A | 6/2019 |
| CN | 110779534 A | 2/2020 |
| EP | 3300047 A1 | 3/2018 |
| EP | 3462754 A1 | 4/2019 |
| JP | 2009199138 A | 9/2009 |
| JP | 2010128637 A | 6/2010 |
| JP | 2020154913 A | 9/2020 |
| KR | 20090090604 A | 8/2009 |
| KR | 20120020971 A | 3/2012 |
| KR | 20140067108 A | 6/2014 |
| KR | 20190090604 A | 8/2019 |

OTHER PUBLICATIONS

Search Report for British Patent Application No. GB2106759.0; Oct. 13, 2021.
Office Action for Korean Patent Application No. 10-2021-0072024; Jun. 24, 2022.
Office Action for Japanese Patent Application No. 2021-094260; May 30, 2022.
Search Report for Japanese Patent Application No. 2021-094260; May 31, 2022.
Examination Report; British Patent Application No. GB2106759.0; Apr. 28, 2023.
Office Action; Chinese Patent Application No. 202110623849.4; Mar. 31, 2023.
Office Action; Korean Patent Application No. 10-2021-0072024; Dec. 27, 2022.

* cited by examiner

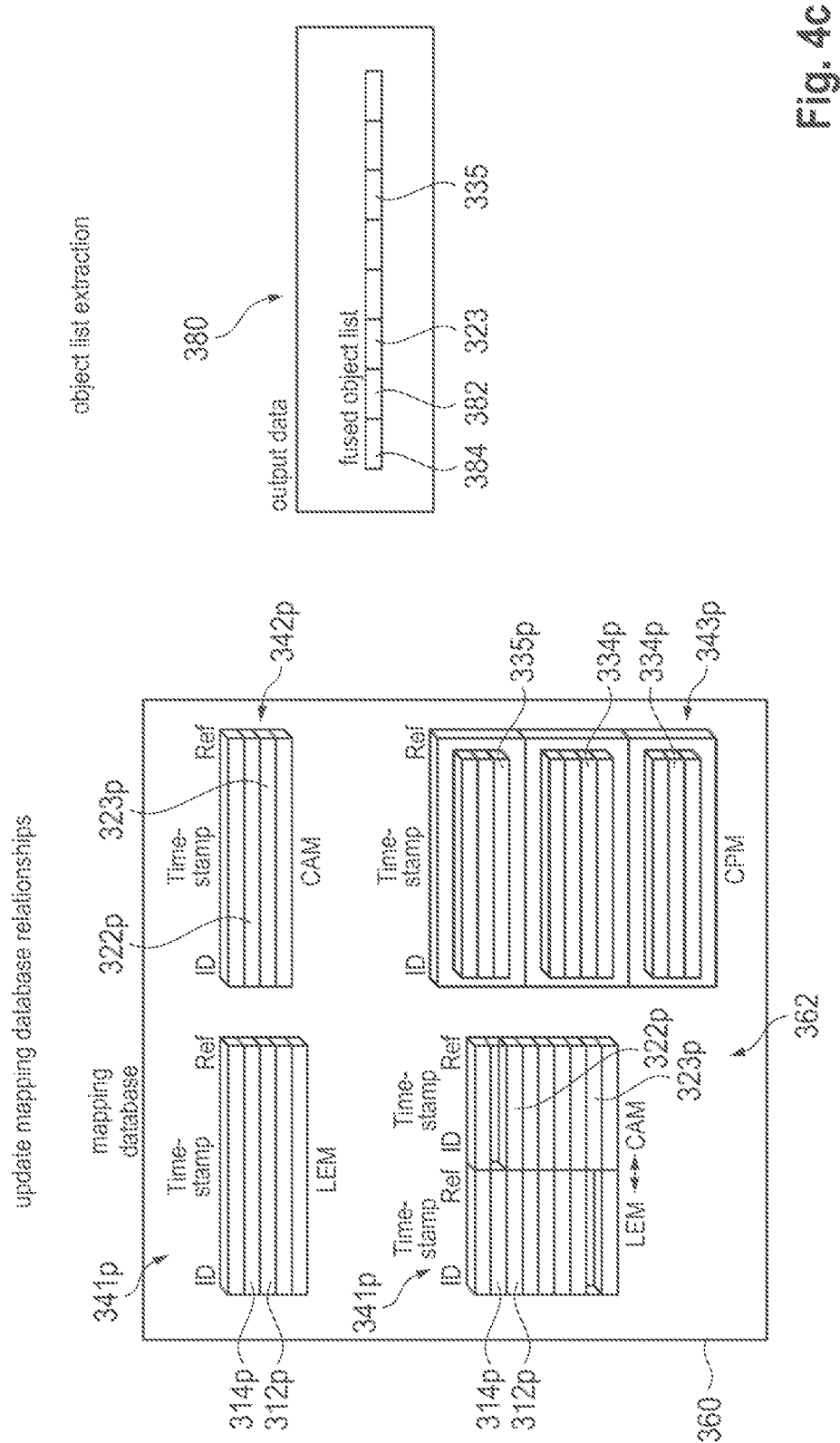

VEHICLE, METHOD, COMPUTER PROGRAM AND DEVICE FOR MERGING OBJECT INFORMATION ABOUT ONE OR MORE OBJECTS IN THE SURROUNDINGS OF A VEHICLE

PRIORITY CLAIM

This patent application claims priority to German Patent Application No. 10 2020 207 065.2, filed 5 Jun. 2020, the disclosure of which is incorporated herein by reference in its entirety.

SUMMARY

Illustrative embodiments relate to a transportation vehicle, a method, a computer program and an apparatus for combining object information relating to one or more objects in an environment of a transportation vehicle from different data sources. In particular, illustrative embodiments relate to a transportation vehicle, a method, a computer program and an apparatus for combining object information from environmental information relating to the environment of the transportation vehicle, which environmental information is provided by a sensor and a transmitter separated from the transportation vehicle.

BRIEF DESCRIPTION OF THE DRAWINGS

Disclosed embodiments are described in more detail below with reference to the drawings, in which:

FIG. 4c shows a schematic illustration of a procedure for combining the assigned object information.

DETAILED DESCRIPTION

Figure 1:
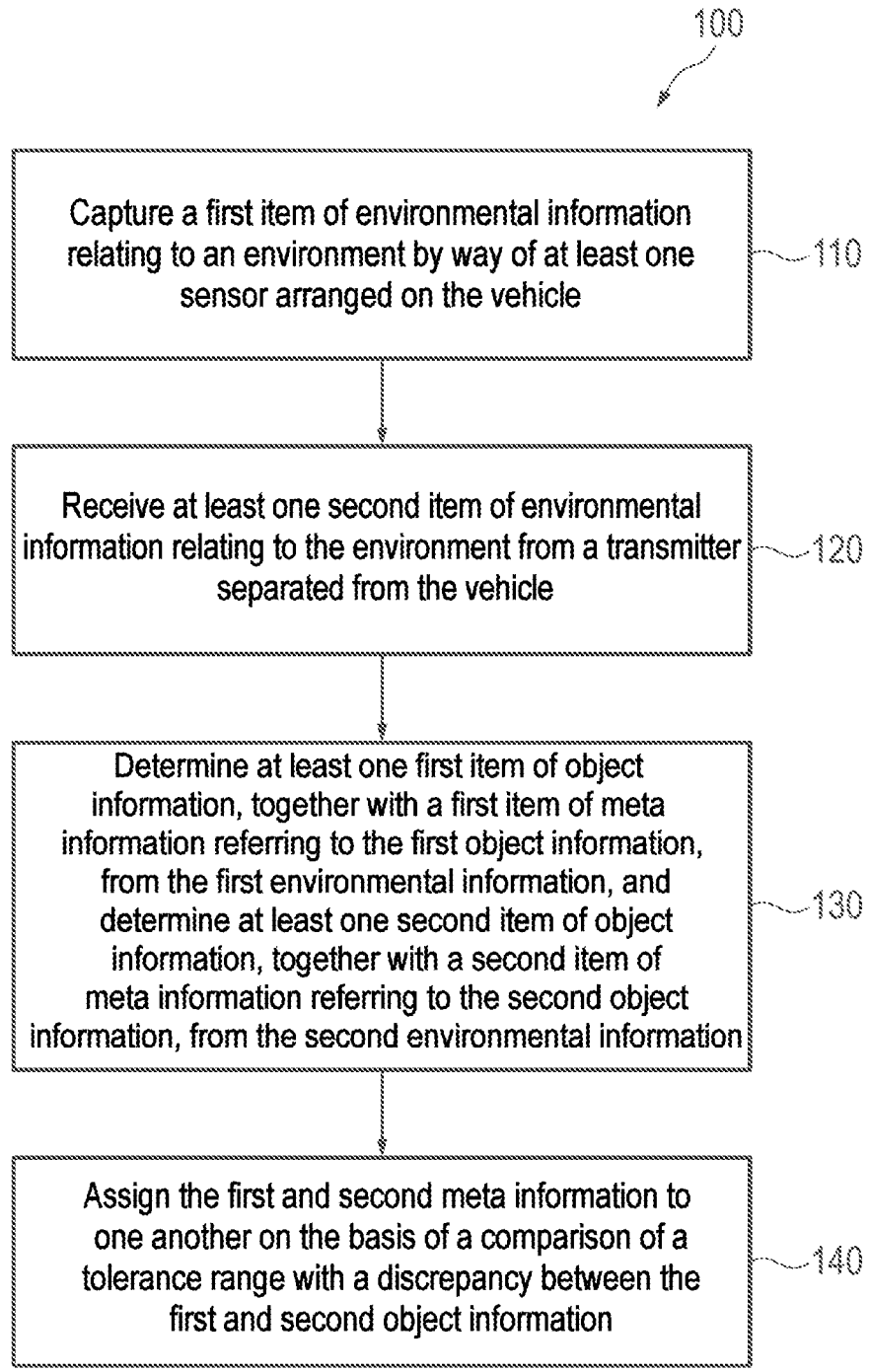
FIG. 1 shows a flowchart for schematically illustrating a method for combining object information relating to one or more objects in an environment of a transportation vehicle from different data sources.

Data/information communicated between transportation vehicles or between transportation vehicles and transmitters installed in a stationary manner on infrastructure objects can help transportation vehicles to perceive their environment as integrally as possible. Such information can be referred to as vehicle-to-vehicle data (V2V) or vehicle-to-infrastructure data (V2I) or generally as vehicle-to-everything data (V2X).

In this case, an interface of the transportation vehicles to the transmitters installed in a stationary manner can be considered to be a further sensor system which provides the transportation vehicles with additional information relating to their environment, such as, V2I data. It is necessary to quickly and efficiently combine the V2V and V2I data communicated between transportation vehicles and the stationary transmitters with sensor data from one or more sensors fitted to the transportation vehicles to represent the environment on the basis of the sensor data and V2I data.

The combined data can be represented in a so-called "cooperative environmental model".

Document US 2015/0166071 A1 describes a concept for assigning sensor data from a first and a second sensor, which can be assigned to identical objects, on the basis of a comparison of a fuzziness of the respective sensor data. The fuzziness of the sensor data may vary on account of external influences and, as a result, can lead to incorrect assignments.

Document KR 20190090604 A describes a concept for combining sensor data from a radar sensor and V2V data communicated between transportation vehicles on the basis of a number of objects captured by the sensor data and V2V data. However, the combined data may have undesirable redundancies.

Document EP 3 462 754 A1 describes a method for transmitting a V2X message by a V2X communication device of a transportation vehicle. The method comprises receiving a V2X message from an external V2X communication device which provides basic information relating to the external V2X communication device, generating a CP message (collective perception) for generating a collective perception of at least one object detected by the V2X communication device, and transmitting the CP message. In this case, the V2X message contains ID information, which identifies the external V2X communication device, and position information, which indicates a position of the external V2X communication device. In addition, the generation of the CP message on the basis of the V2X message comprises determining whether an object, to which the external V2X communication device refers, is the same object as the detected object. However, this concept does not consider combining data from different sensors.

Other previously known approaches for providing a cooperative environmental model are based on the fact that data arriving via a V2X interface are fused with data from the sensor system directly after reception. That is to say, there is an immediate assignment between the data relating to the objects captured by the sensor system and those captured by the data received via the V2X interface. Such approaches exhibit restrictions in terms of their flexibility if an assignment between the data is intended to be established or canceled.

Therefore, there is the need for an improved concept for combining information from different data sources.

The concept which is described by the independent and dependent claims herein can satisfy this need.

Exemplary embodiments are based on the idea of storing information (object information) from different data sources, which relates to identical objects in an environment of a transportation vehicle, in an information database without mutual assignment and of linking the information to one another on the basis of an assignment of meta information respectively associated with the information. The meta information can be stored in a database separate from the information database.

Examples of such objects may be any road users, for example, pedestrians, cyclists or other transportation vehicles, as well as stationary objects, for example, infrastructure objects or planting in the environment of the transportation vehicle. Accordingly, the above-mentioned information relates, for example, to a position, an acceleration or a size provided from data sources, for example, a sensor and a transmitter separated from the transportation vehicle.

The assignment relates, in particular, to an assignment of mutually redundant information which relates to an identical object in the environment of the transportation vehicle.

Assigning the information makes it possible to combine or filter items of information assigned to one another and to thereby reduce redundancies between the information from the different data sources. The combined or filtered object information can then be used to represent a so-called "cooperative" environmental model.

The assignment of the meta information can be continuously updated on the basis of newly received object information. Assignments/links of the object information stored in the information database can be canceled and newly created. In this manner, the cooperative environmental model can be continuously updated.

Exemplary embodiments provide a method for combining object information relating to one or more objects in an environment of a transportation vehicle from different data sources. The method comprises capturing a first item of environmental information relating to the environment by way of at least one sensor arranged on the transportation vehicle and receiving at least one second item of environmental information relating to the environment from a transmitter separated from the transportation vehicle. The method also comprises determining at least one first item of object information, together with a first item of meta information referring to the first object information, from the first environmental information and determining at least one second item of object information, together with a second item of meta information referring to the second object information, from the second environmental information. The method also comprises assigning the first and second meta information to one another on the basis of a comparison of a tolerance range with a discrepancy between the first and second object information.

The first and second environmental information comprises, for example, a set of information relating to a plurality of the objects in the environment. In the context of the present disclosure, objects may be road users, for example, pedestrians or transportation vehicles, as well as objects of an infrastructure in the environment of the transportation vehicle. The transportation vehicle may be, in particular, a transportation vehicle controlled in an automated manner.

Accordingly, the first and second environmental information comprises, for example, positions, speeds, sizes, rotational variables (for example, angular velocity and/or angular acceleration) and accelerations of the other transportation vehicles in the environment.

The at least one sensor is, for example, a lidar sensor, a radar sensor, an ultrasonic sensor or a camera. The positions, speeds, accelerations and/or sizes of the objects/transportation vehicles in the environment, which are included in the first environmental information, emerge, for example, from one or more so-called "point clouds" which are generated, for example, when monitoring the environment using the lidar sensor and represent the environment in a three-dimensional manner. Alternatively or additionally, the first environmental information may emerge from one or more recordings of the camera.

The transmitter separated from the transportation vehicle corresponds, for example, to a transmitter installed on a further transportation vehicle or in a stationary manner. The transmitter may be coupled to a sensor system or to one or more further transmitters for the purpose of capturing the second environmental information.

The transmitter installed on the further transportation vehicle is coupled to the sensor system of the further transportation vehicle, for example.

The transmitter may transmit the second environmental information to the transportation vehicle in one or more messages. As explained in more detail later, such messages may be so-called collective perception (CP) messages and/or cooperative awareness (CA) messages. In a similar manner to the first environmental information, the second environmental information may comprise positions, speeds, sizes and accelerations of the other transportation vehicles in the environment.

The first object information and the second object information may be included in the first and the second environmental information, respectively, and may indicate, for example, a position, a speed, an acceleration and/or a size of one or more of the objects. Accordingly, the determination of the first and second object information may comprise selecting the first and second object information from the first and second environmental information, respectively.

In addition, the first and second meta information linked to the first and second object information may likewise be included in the first and second environmental information, respectively. Accordingly, the determination of the first and second meta information may comprise selecting the first and second object information from the first and second environmental information, respectively.

The meta information may contain a reference or pointer which references the first and second object information. The pointer comprises, for example, a transportation vehicle identification sign (object identifier) based on the first or second object information, a time stamp and/or a reference sign for referencing the associated object information.

Meta information of redundant object information relating to identical objects is combined, for example, by assigning the first and second meta information on the basis of the comparison of the tolerance range with the discrepancy between the first and second object information. The first and second meta information is assigned to one another, for example, if a discrepancy between the object information linked to the first and second meta information is less than or equal to the tolerance range.

Conversely, an assignment of the first and second meta information can be rejected if this discrepancy is greater than the tolerance range. The tolerance range can be selected in such a manner that it is plausible for object information with discrepancies which are less than the tolerance range to relate to the same object. The tolerance range is one meter or half a meter, for example.

It shall be pointed out that, although the text above refers only to the assignment of meta information of two items of object information, a plurality of items of object information relating to an identical object can be assigned using the method explained above.

Meta information assigned to one another can be used to combine redundant object information, that is to say object information relating to the same object, to at least reduce or ideally eliminate redundancies which increase a computing load needed to create or update a cooperative environmental model. As a result, the computing load needed overall to control the transportation vehicle in an automated manner is reduced, for example.

The object information and the meta information can be stored in databases which are separate from one another. The assignment of the meta information can be determined by accordingly sorting or linking the meta information in the database, whereas the object information within the database may be sorted in any desired manner or may be "unlinked" to one another.

The assignment of the object information can therefore be determined, as it were, only by the assignment of the meta information and not by appropriately sorting or organizing the object information in its database.

On account of this, to update the assignment of the object information, it is not absolutely necessary to newly sort or link the object information within its database. This makes it possible to save computing load required for this purpose.

The assignment of the object information using the meta information assigned to one another can therefore also be more efficient than a direct assignment of the object information, for example by appropriate links of the object information within the database.

In some exemplary embodiments, the method comprises combining the first and second object information to form a third item of object information on the basis of an assignment of the first and second meta information, wherein the third object information contains the first object information, the second object information or a combination of the first and second object information.

The third object information corresponds, for example, to the first object information, the second object information or, for example, a mean value of the first and second object information.

In the case of a plurality of items of object information assigned to one another, the third object information comprises a list of combined object information, for example.

The third object information therefore contains at least fewer redundancies than the set of first and second object information and therefore requires a smaller amount of computing effort during its further processing than the set of first and second object information.

In some exemplary embodiments, the method is carried out in the transportation vehicle and the second environmental information is received via a message communicated between road users.

The method is carried out, for example, by a control module installed in the transportation vehicle. The message is a CA message, for example.

As a result of the method being carried out in the transportation vehicle, a latency of the sensor data may be lower than if the method were carried out outside the transportation vehicle, for example, by a processor separated from the transportation vehicle.

In some exemplary embodiments, the assignment of the first and second meta information to one another comprises mapping the first and second object information to a common time, and assigning the first and second meta information to one another on the basis of a comparison of the tolerance range with a discrepancy between the mappings of the first and second object information to the common time.

To map the first and second object information to the common time, it is possible to carry out an interpolation or extrapolation on the basis of the first and second object information, respectively.

To increase a confidence of the respective mappings of the first and second object information, one or more items of object information which were determined earlier and are assigned to the same objects as the first and second object information can be taken into account, in particular, in the interpolation or extrapolation. For example, for the interpolation, positions of a transportation vehicle in the environment, to which the first object information relates, which were measured at an earlier time are included in the interpolation or extrapolation for mapping the first object information to the common time. A similar process can be carried out when mapping the second object information to the common time.

Measurement times, so-called "time stamps", of the first and second object information can be concomitantly included in the interpolation or extrapolation. The common time can generally correspond to a time stamp assigned to the first and second object information or to a time before or after these time stamps. The first object information can therefore be mapped to the time stamp of the second object information or vice versa, for example.

The mapping of the first and second object information to the common time can also be understood as meaning synchronization of the first and second object information. Mapping to a later time after the time stamps of the first and second object information can be referred to as "prediction".

If the first and second object information relates to different measurement times or is assigned to different time stamps, the comparability of the information may be inadequate for a valid assignment of the first and second object information. The synchronization described above can be used to provide comparable values, specifically the mappings of the first and second object information, for a valid assignment of the first and second object information.

In some exemplary embodiments, the mapping of the first object information and the second object information to the common time comprises Kalman filtering based on the first and/or second object information, a first time stamp assigned to the first object information and/or a second time stamp assigned to the second object information.

In the context of the present disclosure, Kalman filtering based on the first and/or second object information and/or the time stamps thereof denotes application of a Kalman filter to the first and/or second object information and the time stamps thereof. Object information determined at an earlier time can again be concomitantly included in the Kalman filtering.

The corresponding time stamps are included in the associated meta information of the object information, for example.

It goes without saying that the disclosure of a plurality of processes, operations or functions disclosed in the description or the claims shall not be interpreted as being in the particular order, unless explicitly or implicitly stated otherwise, for example, for technical reasons. Therefore, these are not limited to a particular order by the disclosure of a plurality of operations or functions unless these operations or functions cannot be interchanged for technical reasons. Furthermore, in some examples, an individual function, process or operation may include a plurality of subfunctions, subprocesses or suboperations and/or may be broken up into these. Such suboperations may be included and may be part of the disclosure of this individual operation unless explicitly excluded.

Exemplary embodiments may also be or relate to a computer program having a program code for carrying out one or more of the above methods when the computer program is executed on a computer or processor. Operations or processes of different methods described above can be carried out by programmed computers or processors. Examples may also cover program memory apparatuses, for example, digital data storage media, which are machine-readable, processor-readable or computer-readable and code machine-executable, processor-executable or computer-executable programs of instructions. The instructions carry out some or all of the operations of the methods described above or cause the execution thereof. The program memory apparatuses may comprise or be, for example, digital memories, magnetic storage media, for example, magnetic disks and magnetic tapes, hard disk drives or optically readable digital data storage media. Further examples may also cover computers, processors or control units which are programmed to carry out the operations of the methods described above or (field) programmable logic arrays ((F)PLAs) or (field) programmable gate arrays ((F)PGA) which are programmed to carry out the operations of the methods described above.

Exemplary embodiments relate to an apparatus for combining object information relating to one or more objects in an environment of a transportation vehicle from different data sources. The apparatus comprises one or more interfaces for communicating with a sensor arranged on the transportation vehicle and with a transmitter separated from the transportation vehicle, and a control module for carrying out one of the methods described above.

In exemplary embodiments, the one or more interfaces of the apparatus may be contacts of the control module. In exemplary embodiments, they may also be separate hardware. They may comprise memories which at least temporarily store the first and/or second object information. The one or more interfaces can be designed to receive electrical signals, for example, may be designed as a bus interface or as an optical interface. In exemplary embodiments, they may also be designed for radio transmission and may comprise a radio front end and associated antennas. The at least one interface may also comprise, for example, for the CAN bus (CAN:=Controller Area Network), synchronization mechanisms for synchronizing with the respective transmission medium. In exemplary embodiments, the one or more interfaces may be designed to communicate in the transportation vehicle and/or in other transportation vehicles or entities, for example, via a network.

In exemplary embodiments, the control module may be hardware designed to carry out one of the methods described herein. This may be any desired processor cores, such as digital signal processor cores (DSPs), or other processors. In this case, exemplary embodiments are not restricted to a particular type of processor core. Any desired processor cores or a plurality of processor cores or microcontrollers are conceivable for implementing the control module. Implementations in an integrated form with other apparatuses are also conceivable, for example, in a control unit for a transportation vehicle which additionally also comprises one or more other functions. In exemplary embodiments, the control module may be implemented by a processor core, a computer processor core (CPU =Central Processing Unit), a graphics processor core (GPU=Graphics Processing Unit), an application-specific integrated circuit core (ASIC), an integrated circuit (IC), a system-on-chip core (SOC), a programmable logic element or a field programmable gate array (FPGA) having a microprocessor as the core of the module(s) mentioned above. The control module can therefore correspond to any component which can assign object information from different data sources to one another on the basis of a comparison of the tolerance range with the discrepancy between the object information.

Various exemplary embodiments are now described in more detail with reference to the accompanying drawings in which some exemplary embodiments are illustrated. Optional features or components are illustrated using dashed lines in this case.

Although exemplary embodiments can be modified and changed in various ways, exemplary embodiments are illustrated as examples in the figures and are described in detail herein. However, it should be clarified that there is no intention to restrict exemplary embodiments to the respectively disclosed forms, but rather exemplary embodiments are intended to cover all functional and/or structural modifications, equivalents and alternatives which are in the scope of the disclosure.

It should be noted that an element which is referred to as being "connected" or "coupled" to another element can be directly connected or coupled to the other element or there may be elements in between. In contrast, if an element is referred to as being "directly connected" or "directly coupled" to another element, there are no elements in between. Other terms which are used to describe the relationship between elements should be interpreted in a similar manner (for example, "between" in comparison with "directly in between", "adjacent" in comparison with "directly adjacent" etc.).

The terminology used herein is used only to describe particular exemplary embodiments and is not intended to restrict the exemplary embodiments. As used herein, the singular forms "a", "an" and "the" are also intended to include the plural forms as long as the context does not clearly indicate otherwise. Furthermore, it shall be clarified that the expressions such as "contains", "containing", "has", "comprises", "comprising" and/or "having", as used herein, indicate the presence of the features, integers, operations, work sequences, elements and/or components but do not exclude the presence or the addition of one or more features, integers, operations, work sequences, elements, components and/or groups thereof.

A block diagram can represent, for example, a rough circuit diagram which implements the principles of the disclosure. In a similar manner, a flow diagram, a flowchart, a state transition diagram, a pseudocode and the like can represent different processes or operations which are represented, for example, substantially in the computer-readable medium and are therefore executed by a computer or processor irrespective of whether such a computer or processor is explicitly shown. Methods disclosed in the description or in the patent claims can be implemented by a component having a method or mechanism for carrying out each of the respective operations of these methods.

FIG. 1 shows a flowchart for schematically illustrating a method 100 for combining object information relating to one or more objects in an environment of a transportation vehicle from different data sources.

The method 100 comprises capturing 110 a first item of environmental information relating to an environment by way of at least one sensor arranged on the transportation vehicle, and receiving 120 at least one second item of environmental information relating to the environment from a transmitter which is separated from the transportation vehicle. The method 100 also comprises determining 130 at least one first item of object information, together with a first item of meta information referring to the first object information, from the first environmental information and determining at least one second item of object information, together with a second item of meta information referring to the second object information, from the second environmental information. The method 100 also provides for the first and second meta information to be assigned to one another on the basis of a comparison of a tolerance range with a discrepancy between the first and second object information.

In comparison with known methods, the object information from different data sources is therefore not immediately assigned after receiving the environmental information, for example, but rather via the assignment of the meta information.

To continuously update assignments of successively measured first and second object information on the basis of the assignment of the meta information, the method 100 can be iteratively carried out.

Figure 2:
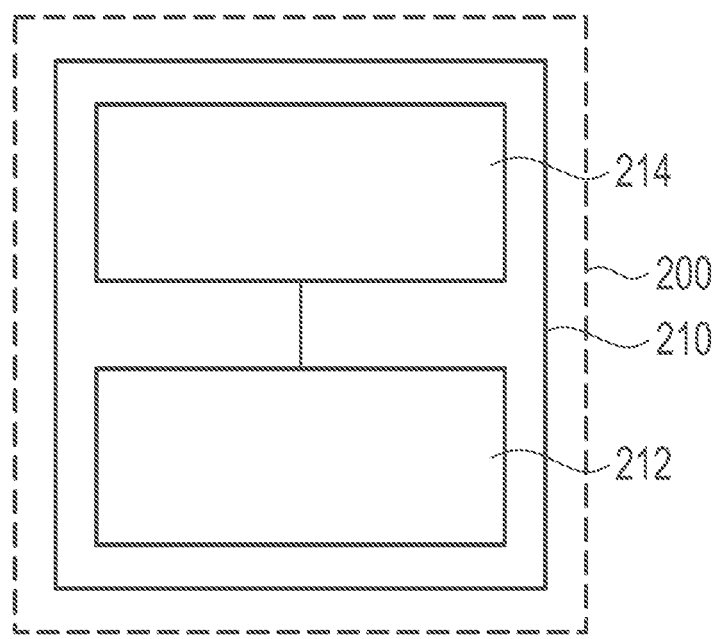
FIG. 2 shows a block diagram for schematically illustrating an apparatus for carrying out the method.

The method 100 can be carried out by an apparatus 210, as shown in FIG. 2, which is installed in a transportation vehicle 200, for example. The apparatus 200 comprises one or more interfaces 214 and a control module 212. The one or more interfaces 214 comprise, for example, at least one interface to the sensor (not shown) for capturing 110 the first environmental information. The one or more interfaces 214 also comprise at least one interface to the transmitter (not shown) for receiving 120 the second environmental information.

The control module 212 comprises, for example, a processor or computer for determining 130 the first and second object information from the first and second environmental information, respectively. The control module 212 is also designed to assign 140 the first and second object information.

Accordingly, the different data sources comprise the sensor of the transportation vehicle 200 and at least one transmitter which is separated from the transportation vehicle 200 and is used to communicate with other road users, for example. As described above, a so-called "cooperative environmental model" can therefore be created "in cooperation" with other road users.

Figure 3:
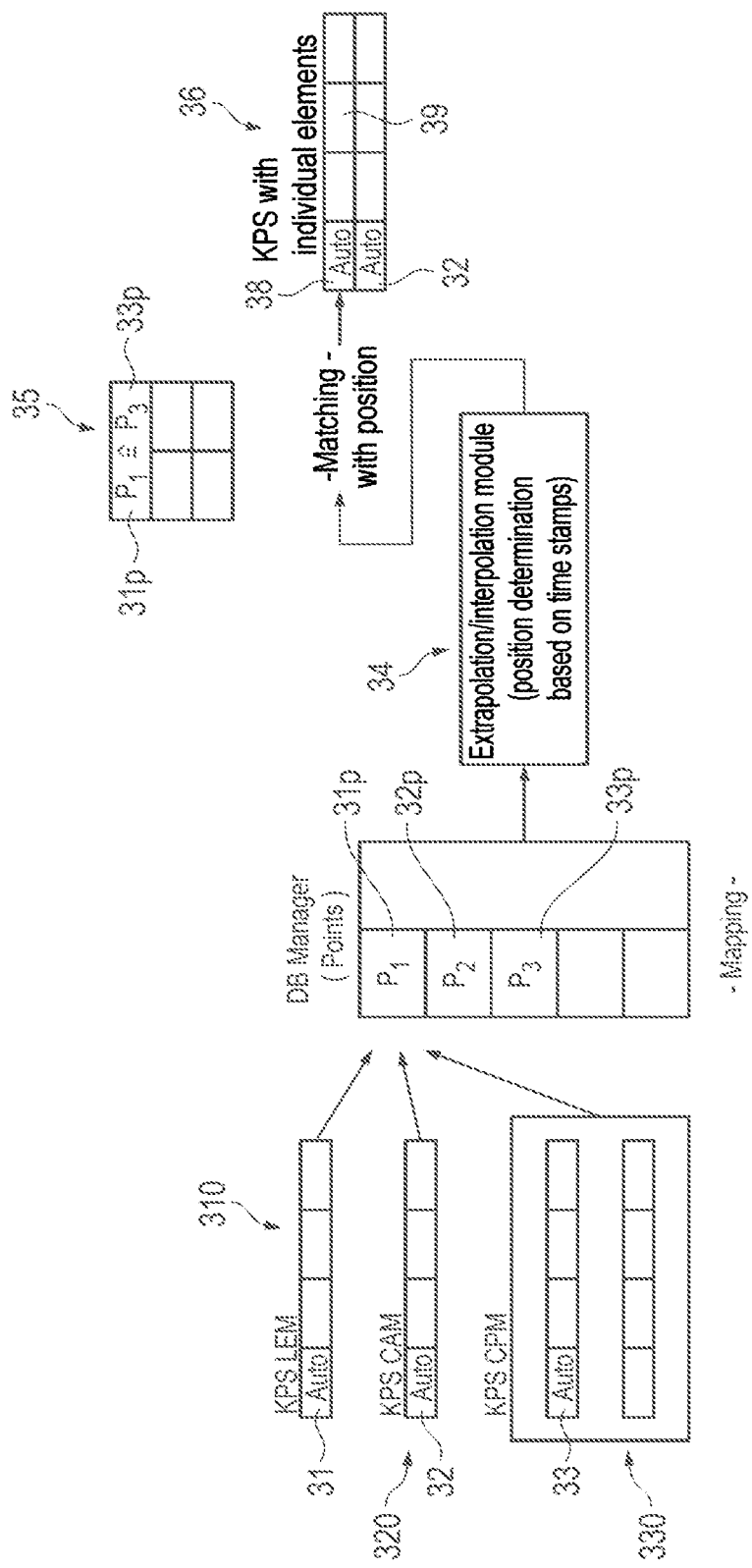
FIG. 3 shows a block diagram for schematically illustrating an exemplary embodiment of the method.

FIG. 3 schematically shows an exemplary embodiment of the method 100. Input data for the cooperative environmental model form the first and second environmental information which can be regarded as object lists containing object information relating to a plurality of objects in the environment. In the exemplary embodiment explained here by way of example, the information comes from three different data sources.

In the exemplary embodiment shown, the first environmental information comprises a "local vehicle environmental model" 310 generated from sensor data from a sensor installed on the transportation vehicle, and the second environmental information comprises a collective perception message (CPM) 330 and a cooperative awareness message (CAM) 320.

The CAM 320 is a message which is transmitted by another transportation vehicle, for example, in the environment, and contains information relating to hazardous situations (for example, an imminent traffic jam or a broken-down further transportation vehicle) which can be detected by the other transportation vehicle. The CPM 330 is, for example, a message which is transmitted by a transmitter installed in a stationary manner or by another transportation vehicle and contains information based on sensor data from a sensor system which is connected to the transmitter or to the other transportation vehicle.

Upon reception, the input data are stored in a memory (not shown) of the cooperative environmental model (unchanged, unsorted, unlinked). Received data from the local transportation vehicle environmental model 310 overwrite previously received data from this source. Object information from previously received messages (CAM and CPM) relating to objects which have already been captured is updated using the object information in the CAM 320 and the CPM 330. Object information in the CAM 320 or CPM 330 relating to objects which have not previously been captured is stored in a new memory.

The local transportation vehicle environmental model 310 comprises a first item of object information 31. The CAM 320 and the CPM 330 each comprise one of the second items of object information 32 and 33. The first and second object information 31, 32 and 33 respectively denotes, for example, a detected transportation vehicle position in the environment of objects. The transportation vehicle positions 31, 32 and 33 may fundamentally relate to identical or different objects (transportation vehicles, obstacles or persons).

First meta information 31p can be assigned to the transportation vehicle position 31 and second meta information 32p and 33p, which can be stored separately from the transportation vehicle positions 31, 32 and 33 in a so-called "assignment database" ("mapping database"), can be assigned to the transportation vehicle positions 32 and 33. Meta information stored in the assignment database and relating to objects which have already been captured can be updated and meta information relating to newly captured objects can be added to the assignment database.

The meta information 31p, 32p and 33p can be understood as meaning a reference or pointer, which references the transportation vehicle positions 31, 32 and 33, and contains, for example, a transportation vehicle identification sign, time stamp and/or reference sign related to the transportation vehicle positions 31, 32 and 33. The time stamps can indicate a time when measuring the transportation vehicle positions 31, 32 and 33. The transportation vehicle identification signs are, for example, unique codes for transportation vehicles in the environment, to which the transportation vehicle positions 31, 32 and 33 are assigned. "Older" meta information can be updated, for example, with "newer/more recent" meta information relating to the same identification sign.

The transportation vehicle identification signs assigned to the transportation vehicle positions 31, 32 and 33 may be different even though the transportation vehicle positions 31, 32 and 33 relate to an identical transportation vehicle, since the sensor and the transmitter determine the transportation vehicle identification signs independently of one another. The reference signs refer to the corresponding transportation vehicle positions 31, 32 or 33, for example.

A subsequent operation at 34 comprises mapping the transportation vehicle positions 31, 32 and 33 to a common time by interpolation or extrapolation based on the transportation vehicle positions 31, 32 and 33 and the respectively associated time stamps.

In a further operation at 35, a matching algorithm is used to check which objects from the different data sources can be assigned to the same real object. In operations at 35, a discrepancy between the transportation vehicle positions 31, 32 and 33 mapped to the common time can take place on the basis of a comparison. In the case of a discrepancy within a tolerance range, the meta information relating to the transportation vehicle positions mapped to the common time (the mappings of the transportation vehicle positions to the common time) can be assigned to one another. In the present case, the tolerance range may be considered, for example, to be a predetermined range of values for a distance between the mappings of the transportation vehicle positions. In the present exemplary embodiment, the meta information 31p and 33p is assigned to one another, for example. In the event of discrepancies outside the tolerance range, an assignment between the meta information associated with the considered mappings of the transportation vehicle positions is disregarded, as in the case of the meta information 32p in the present example.

On the basis of the assignment of the meta information 31p and 33p, the associated transportation vehicle positions 31 and 33 can be assigned to one another and, in a subsequent operation at 36, can be combined to form a third item of object information 38. The third object information 38 may correspond to a combination, for example, a transportation vehicle positions 31 and 33 averaged from the transportation vehicle positions 31 and 33 or one of the transportation vehicle positions 31 and 33 themselves.

To assign object information (such as transportation vehicle positions here) relating to the same/identical transportation vehicles to one another and to combine the information as described above, the tolerance range can be selected in such a manner that mappings of the transportation vehicle positions with a distance of less than 0.5 meters are assigned to one another. As a result, it is plausible for transportation vehicle positions with discrepancies within this tolerance range to be assigned to the same transportation vehicle. Depending on the application, this distance can be selected to be larger or smaller.

In the present example, the transportation vehicle positions 31 and 33 relate to the same transportation vehicle and can therefore be considered to be "redundant".

In the present case, the averaged transportation vehicle position 38, for example, is output together with the transportation vehicle position 32 in a common list 39. The list 39 can generally be generated from combined object information (such as the third object information 38) and further object information which has not been assigned to another item of object information. The list 39 can be generated by updating a previously generated list with combined object information, in particular, if the method described above is carried out iteratively.

As a result of the (redundant) transportation vehicle positions 31 and 33 being combined, the common list 39 has fewer redundancies than exist between the local transportation vehicle environmental model 310, the CAM 320 and/or the CPM 330.

The list 39 can then be used for the purposes of creating or updating the cooperative environmental model and therefore controlling a transportation vehicle in an automated manner. An amount of computing required for this during data processing of the list 39 to update or create the cooperative environmental model may be lower, on account of the reduced redundancies, than during separate data processing of the local transportation vehicle environmental model 310, the CAM 320 and the CPM 330.

Having the transportation vehicle positions 31, 32 and 33 available makes it possible to access them again in the event of a possibly subsequently desired new assignment of the meta information for the purpose of creating an updated cooperative environmental model.

It is obvious to a person skilled in the art that the above method 100 can be applied to other types of first and second object information with appropriate adaptations known to a person skilled in the art. Examples of other types of object information may comprise a size, a shape, a speed, an acceleration or further movement parameters of the transportation vehicles/persons/obstacles in the environment.

Figure 4A:
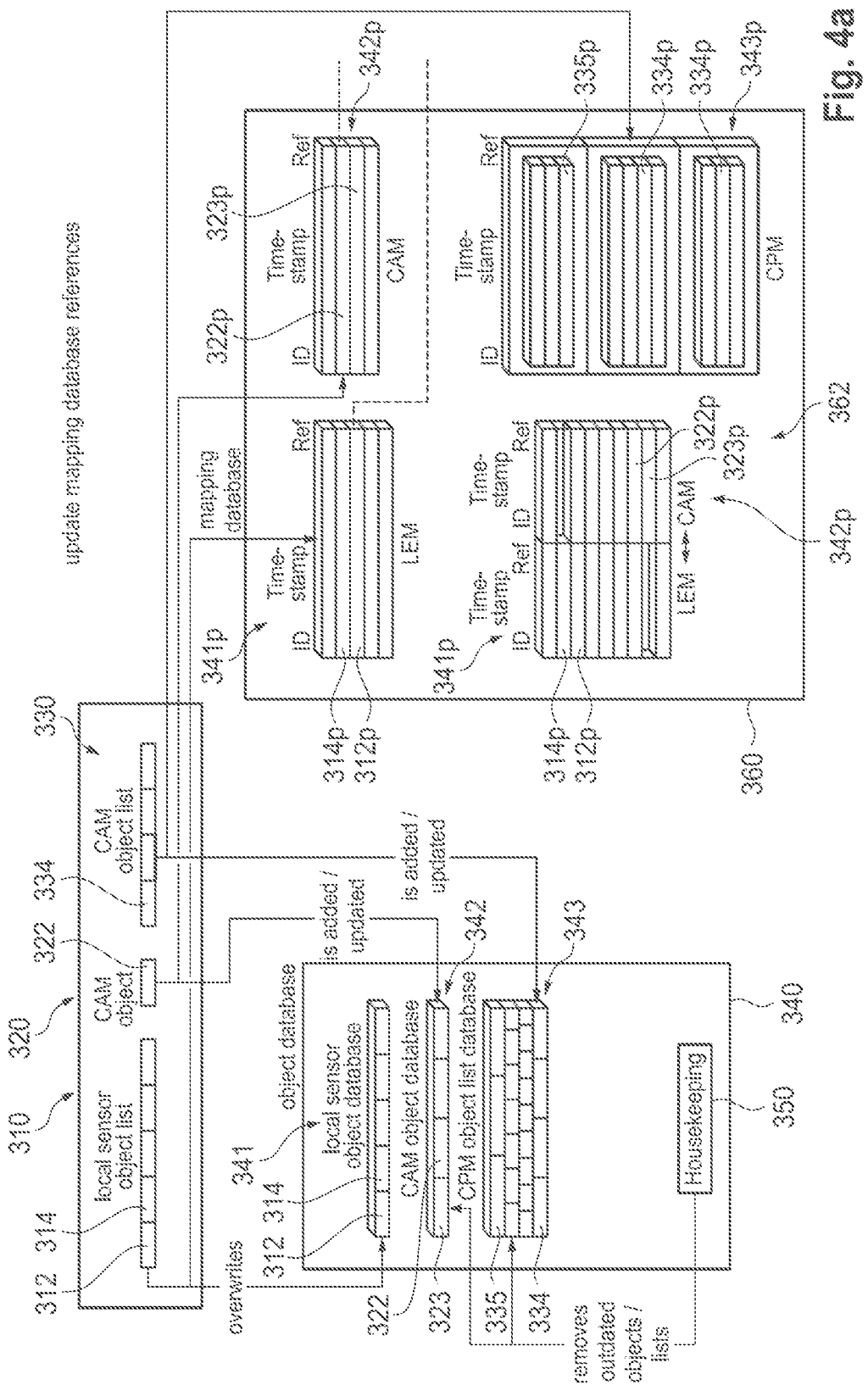
FIG. 4a shows a block diagram for schematically illustrating the storage of environmental information and object information from the different data sources in a further exemplary embodiment of the method.
Figure 4B:
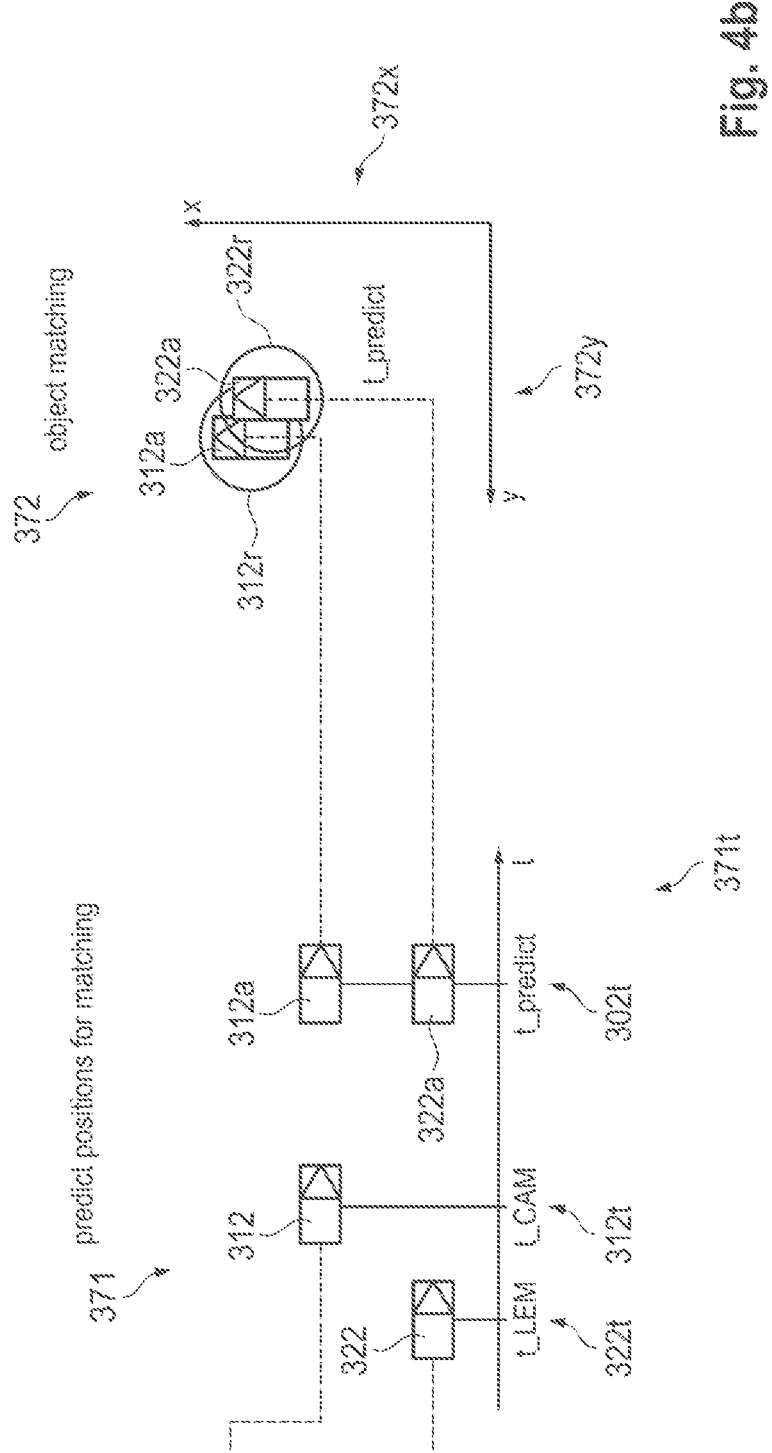
FIG. 4b shows a schematic illustration of a procedure for assigning the object information.

FIGS. 4a to 4c show a further exemplary embodiment of the method 100.

In FIG. 4a, the local transportation vehicle environmental model 310 derived from sensor data comprises first object information. In the example shown, the information is measured transportation vehicle positions 312 of a first transportation vehicle and measured transportation vehicle positions 314 of a second transportation vehicle, which transportation vehicles are in the environment.

The CAM 320 and the CPM 330 comprise second object information. In the example shown, the CAM 320 comprises a further measured transportation vehicle position 322 of the first transportation vehicle and the CPM 330 comprises a further measured transportation vehicle position 334 of the second transportation vehicle.

As can be seen in FIG. 4a, the measured transportation vehicle positions 312, 314, 322 and 334 are stored in separate lists 341, 342 and 343 in an object database 340. Object information (that is to say, in particular, the transportation vehicle positions 312 and 314) relating to the local transportation vehicle environmental model 310 replaces older object information stored in the list 341, for example. Object information in the CAM 320 and the CPM 330, that is to say, in particular, the transportation vehicle positions 322 and 334, is added to the respective lists 342 and 343 which already contain older object information 323 and 335 from a previous CAM or CPM.

A function 350 of the object database for data management ("housekeeping") can eliminate object information/transportation vehicle positions from a previously received CAM or CPM that is/are stored in the lists 342 and 343. For this purpose, a certain validity period can be assigned to the transportation vehicle positions. When a time since the transportation vehicle positions were stored in the lists 242 and 243 without being updated exceeds the validity period, the function 350 can eliminate the corresponding object information to release storage space for more recent object information. As a result, object information relating to objects which are no longer perceived by the sensor, for example, is rejected, in particular, to counteract possible incorrect detection.

Meta information 312p, 314p, 322p, 323p, 334p and 335p respectively assigned to the transportation vehicle positions 312, 314, 322, 323, 334 and 335 is stored in corresponding meta information lists 341p, 342p and 343p in an assignment database 360. As already explained for the preceding exemplary embodiment, the meta information 312p, 314p, 322p, 323p, 334p and 335p respectively comprises an identification sign (an "ID"), a time stamp and a reference sign ("Ref"). The time stamps indicate a time at which the transportation vehicle positions 312, 314, 322, 323, 334 and 335 were measured and/or when the meta information 312p, 314p, 322p, 323p, 334p and 335p was stored in the assignment database 360. The list 343p of meta information associated with the CPM 330 comprises a plurality of entries of the meta information 334p relating to an identical object, since the CPM 330 is based, for example, on transportation vehicle environmental models or environmental measurements of a plurality of transportation vehicles.

The identification signs indicate a link between the meta information and an object or a transportation vehicle. Meta information from the same data source belonging to the same object/transportation vehicle therefore has the same identification signs, for example. Meta information from the same data sources (for example, CAM or CPM) previously stored in the assignment database 360 can be replaced with updated meta information relating to the same objects/transportation vehicles, in particular, if the method 100 is carried out iteratively, by taking into account the identification signs. Meta information which is stored for longer than its validity period in the assignment database 360 without being updated or confirmed by further meta information can be eliminated to release storage space.

As illustrated using the example of a comparison 362 of the meta information lists 341p and 342p, the meta information 312p, 314p, 322p and 323p is initially not assigned to one another, linked to one another or accordingly sorted.

The transportation vehicle positions 312, 314, 322, 323, 334 and 335 may generally have been measured/determined at different times. The time stamps contained in the associated meta information can therefore differ.

As illustrated in FIG. 4b, the transportation vehicle positions can be mapped to a common time. This is illustrated, by way of example, in FIG. 4b for the transportation vehicle positions 312 and 322.

In a first diagram 371 in FIG. 4b, a time stamp 312t associated with the transportation vehicle position 312 and a time stamp 322t associated with the transportation vehicle position 322 are plotted over a time axis 371t. As can be seen, the measurement time of the transportation vehicle positions 312 and 322 differs.

To be able to assess whether the transportation vehicle positions 312 and 322 are related to the same transportation vehicle, the transportation vehicle positions 312 and 322, as schematically illustrated in diagram 371, can be mapped to a common (future) time after the time stamps 312t and 322t. Such mapping can therefore be understood as meaning a "forecast" or "prediction".

Mappings 312a and 322a generated as a result are shown in spatial coordinates 372x and 372y in a second diagram 372 for the purpose of illustrating a subsequent procedure for assigning meta data to the respective transportation vehicle positions 312 and 322.

The mappings 312a and 322a can be generated by extrapolation based on the transportation vehicle positions 312 and 322 and their associated time stamps 312t and 322t. For the extrapolation, it is possible to use a Kalman filter which can generate the mappings 312a and 322a as input variables on the basis of the transportation vehicle positions 312 and 322, the time stamps 312t and 322t and, for example, speeds assigned to the transportation vehicle positions, accelerations and/or transportation vehicle positions measured at an earlier time.

The above-described extrapolation can take place by executing a corresponding matching algorithm in a so-called prediction module.

It is clear to a person skilled in the art that, in addition to the Kalman filter, further extrapolation methods or interpolation methods come into consideration for mapping the transportation vehicle positions 312 and 322 to the common time 302t.

As schematically illustrated in diagram 372, a discrepancy between the mappings 312a and 322a of the transportation vehicle positions 312 and 322 can be used to assess whether the transportation vehicle positions 312 and 322 can be assigned to the same transportation vehicle and are therefore redundant. To check whether the discrepancy between the mappings 312a and 322a is within the tolerance range, it is possible to determine whether the mappings 312a and 322a of the transportation vehicle positions are each within a tolerance range with a radius 312r or 322r around the respective other mapping 312a and 322a of the transportation vehicle position.

In the example shown, the mappings 312a and 322a are within the tolerance range, for example. For this reason, it is plausible for the mappings 312a and 322a to relate to the same (first) transportation vehicle in the environment. The meta information 312p and 322p, as shown in FIG. 4c, and therefore the transportation vehicle positions 312 and 322, linked to the meta information 312p and 322p assigned to one another, in the local transportation vehicle environmental model 310 and in the CAM 320 or in the lists 341 and 342 in the object database 340 can therefore be assigned to one another.

A similar procedure can be followed to check for redundancy in the remaining transportation vehicle positions. As a result, it is possible to show, for example, that the meta information 314p and 344p and the associated transportation vehicle positions 314 and 344 can be assigned to the same (second) transportation vehicle and can therefore be assigned to one another.

If the method 100 is carried out iteratively, the Kalman filter can be used to implement incremental, that is to say gradually continuous, tracking of the transportation vehicle positions from the different data sources (local transportation vehicle environmental model 310, CAM 320 and CPM 330) and their discrepancies from one another. In this manner, the assignments determined in the process can be continuously checked and possibly updated. In comparison with further extrapolation methods, the Kalman filter makes it possible to achieve beneficial smoothing. For example, the Kalman filter can be used to smooth a profile of successively determined mappings of transportation vehicle positions and therefore to achieve a higher level of tracking confidence.

The assignment of the meta information 312p and 322p and of the meta information 314p and 344p is illustrated in the comparison 362 in FIG. 4c.

As also shown by FIG. 4c, third object information 382 and 384 can be generated on the basis of the transportation vehicle positions 312 and 322 and 314 and 334 which are assigned to one another, which object information corresponds either to a combined value of the transportation vehicle positions 312 and 322 or 314 and 334 or to individual ones of the transportation vehicle positions 312 322 or 314 and 334. For this purpose, the corresponding transportation vehicle positions 312, 322, 314 and/or 334 are "extracted" as it were from the lists 341, 342 and/or 343 and are possibly combined or inserted into the output list 380. The third object information 382 and 384 is provided and stored in an output list 380 together with transportation vehicle positions 323 and 335 which could not be assigned to any further measured transportation vehicle position.

In some cases, previously determined assignments of meta information from previous runs of the method 100 can be canceled again or confirmed, taking into account the updated/last determined assignments of the transportation vehicle positions 312, 322, 314 and 334. In comparison with "direct" links or assignments, updating (canceling or confirmation) of the assignment of the transportation vehicle positions 312, 322, 314 and 334 on the basis of the assignment of the associated meta information may be more efficient.

If the method 100 is carried out iteratively, the output list 380 can therefore be determined by updating a previously determined output list on the basis of the updated assignments of the transportation vehicle positions.

Redundancies, for example, between the transportation vehicle positions 312 and 322 or 314 and 334, are no longer included in the output list 380 as a result of their assignment or are at least reduced in comparison with the set of transportation vehicle positions from the local transportation vehicle environmental model 310, the CAM 30 and the CPM and therefore no longer contribute to an undesirable increase in a computing load when processing the output list 380. This may have a beneficial effect on a driving behavior and a reaction time of the transportation vehicle 200 controlled in an automated manner.

LIST OF REFERENCE SIGNS

31 Object information/transportation vehicle position;
31p Meta information;
32 Object information/transportation vehicle position;

32p Meta information;
33 Object information/transportation vehicle position;
33p Meta information;
34 Operation;
35 Operation;
36 Operation;
38 Third object information;
39 List;
100 Method for combining object information;
110 Capturing a first item of environmental information;
120 Receiving at least one second item of environmental information;
130 Determining a first and a second item of object information;
140 Assigning the first and second object information to one another;
200 Transportation Vehicle;
210 Apparatus for combining object information;
212 Control module;
214 One or more interfaces;
302t Common time;
310 Local transportation vehicle environmental model;
312 First object information/transportation vehicle position;
312a Mapping of the transportation vehicle position;
312p Meta information;
312r Radius;
312t Time stamp;
314 First object information/transportation vehicle position;
314p Meta information;
320 Cooperative awareness message/CAM;
322 Second object information/transportation vehicle position;
322a Mapping of the transportation vehicle position;
322p Meta information;
322r Radius;
322t Time stamp;
323 Second object information/transportation vehicle position;
323p Meta information;
330 Collective perception message/CPM;
334 Second object information/transportation vehicle position;
334p Meta information;
335 Second object information/transportation vehicle position;
340 Object database;
341 List;
341p Meta information list;
342 List;
342p Meta information list;
343 List;
343p Meta information list;
360 Assignment database;
362 Comparison;
371 Diagram;
371t Time axis;
372 Diagram;
372x Spatial coordinate;
372y Spatial coordinate;
380 Output list;
382 Third object information;
384 Third object information

The invention claimed is:

1. An apparatus for combining data including object information relating to one or more objects in an environment of a transportation vehicle from different data sources including at least one sensor generating data and being arranged on the transportation vehicle and at least one data source providing data via vehicle-to-everything (V2X) data communication, the apparatus comprising:
one or more interfaces configured to communicate with the at least one sensor arranged on the transportation vehicle and with a transmitter separated from the transportation vehicle; and
a control module configured to control:
capture of a first item of environmental information relating to the environment by the at least one sensor,
receipt of a second item of environmental information relating to the environment from the transmitter separated from the transportation vehicle,
determination of a first item of object information, together with a first item of meta information that includes information that identifies an object associated with the first item of object information and includes information for referencing to the first item of object information, from the captured first environmental information,
determination of a second item of object information, together with a second item of meta information that includes information that identifies an object associated with the second item of object information and includes information for referencing to the second item of object information, from the received second environmental information,
comparison of a tolerance range with a discrepancy between the first item of object information and the second item object information,
association of the first meta information with the second meta information based on the comparison, and
combination of the data in a cooperative environmental model, wherein the first and second items of object information are linked together based on the association of the first and second meta information,
wherein the linking of the information to one another based on the assignment of meta information respectively associated with the object information is performed such that the first and second meta information are stored in a database separate from an information database storing object information,
wherein the combination of the data in the cooperative environmental model combines redundant items of object information relating to the same object to reduce redundancies which increase a computing load needed to create or update the cooperative environmental model as part of controlled operation of the transportation vehicle in an automated manner whereby assignment of meta information is continuously updated based on newly received object information so as to update the cooperative environmental model continuously.

2. The apparatus of claim 1, wherein the control module is further configured to control a combination of the first item of object information and the second item of object information to form a third item of object information based on association of the first meta information and the second meta information, wherein the third item of object information contains the first item of object information, the second item of object information or a combination of the first and second items of object information.

3. The apparatus of claim 1, wherein the first item of object information and the second item of object information each comprise a position, a speed, an acceleration, a rotational variable and/or a size of at least one of the one or more objects.

4. The apparatus of claim 1, wherein the association of the linking of the first item of object information with the second item of object information comprises mapping the first item of object information and the second item of object information to a common time, wherein the comparison of the tolerance range with the discrepancy between the first item of object information and the second item of object information compares the tolerance range with a discrepancy between the mappings of the first item of object information and of the second item of object information to the common time.

5. The method of claim 4, wherein the mapping of the first item of object information and of the second item of object information to the common time comprises extrapolation or interpolation based on the first item of object information and/or second item of object information, a first time stamp assigned to the first item of object information and/or a second time stamp assigned to the second item of object information.

6. The apparatus of claim 1, wherein the at least one sensor comprises at least a radar sensor, a lidar sensor, an ultrasonic sensor or a camera.

7. A transportation vehicle comprising:
at least one sensor arranged on the transportation vehicle; and
an apparatus for combining data including object information relating to one or more objects in an environment of a transportation vehicle from different data sources including the at least one sensor generating data and being arranged on the transportation vehicle and at least one data source providing data via vehicle-to-everything (V2X) data communication, the apparatus including:
one or more interfaces configured to communicate with the at least one sensor arranged on the transportation vehicle and with a transmitter separated from the transportation vehicle; and
a control module configured to control:
capture of a first item of environmental information relating to the environment by the at least one sensor,
receipt of a second item of environmental information relating to the environment from the transmitter separated from the transportation vehicle,
determination of a first item of object information, together with a first item of meta information that includes information that identifies an object associated with the first item of object information and includes information for referencing to the first item of object information, from the captured first environmental information,
determination of a second item of object information, together with a second item of meta information that includes information that identifies an object associated with the second item of object information and includes information for referencing to the second item of object information, from the received second environmental information,
comparison of a tolerance range with a discrepancy between the first item of object information and the second item of object information,
association of the first meta information with the second meta information based on the comparison, and
combination of the data in a cooperative environmental model,
wherein the first and second items of object information are linked together based on the association of the first and second meta information, wherein the linking of the information to one another based on the assignment of meta information respectively associated with the object information is performed such that the first and second meta information are stored in a database separate from an information database storing object information, and
wherein the combination of the data in the cooperative environmental model combines redundant items of object information relating to the same object to reduce redundancies which increase a computing load needed to create or update the cooperative environmental model as part of controlled operation of the transportation vehicle in an automated manner whereby assignment of meta information is continuously updated based on newly received object information so as to update the cooperative environmental model continuously.

8. A method for combining data including object information relating to one or more objects in an environment of a transportation vehicle from different data sources including at least one sensor generating data and being arranged on the transportation vehicle, the method comprising:
capturing a first item of environmental information relating to the environment by the at least one sensor arranged on the transportation vehicle;
receiving a second item of environmental information relating to the environment from a transmitter separated from the transportation vehicle;
determining a first item of object information, together with a first item of meta information that includes information that identifies an object in the first item of object information and includes information for referencing to the first item of object information, from the captured first environmental information;
determining a second item of object information, together with a second item of meta information that includes information that identifies an object in the second item of object information and includes information for referencing to the second item of object information, from the received second environmental information;
comparing a tolerance range with a discrepancy between the first item of object information and the second item of object information;
associating the first meta information with the second meta information based on the comparison, and
combining the data in a cooperative environmental model, wherein the first and second items of object information are linked together based on the association of the first and second meta information, wherein the linking of the information to one another based on the assignment of meta information respectively associated with the object information is performed such that the first and second meta information are stored in a database separate from an information database storing object information, and
wherein the combination of the data in the cooperative environmental model combines redundant items of object information relating to the same object to reduce redundancies which increase a computing load needed to create or update the cooperative environmental model as part of controlled operation of the transportation vehicle in an automated manner whereby assignment of meta information is continuously updated based on newly received object information so as to update the cooperative environmental model continuously.

9. The method of claim 8, further comprising combining the first item of object information and the second item of object information to form a third item of object information based on an assignment of the first meta information and the second meta information, wherein the third object information contains the first item of object information, the second item of object information or a combination of the first and second item of object information.

10. The method of claim 8, wherein the first item of object information and the second item of object information each comprise a position, a speed, an acceleration, a rotational variable and/or a size of at least one of the one or more objects.

11. The method of claim 8, wherein the linking of the first with the second item of object information comprises mapping the first item of object information and the second item of object information to a common time, wherein the comparison of the tolerance range with the discrepancy between the first item of object information and the second item of object information compares the tolerance range with a discrepancy between the mappings of the first item of object information and of the second item of object information to the common time.

12. The method of claim 11, wherein the mapping of the first item of object information and of the second item of object information to the common time comprises extrapolation or interpolation based on the first item of object information and/or second item of object information, a first time stamp assigned to the first item of object information and/or a second time stamp assigned to the second item of object information.

13. The method of claim 8, wherein the at least one sensor comprises at least a radar sensor, a lidar sensor, an ultrasonic sensor or a camera.

14. A non-transitory computer readable medium including a computer program having a program code for carrying out a method for combining data including object information relating to one or more objects in an environment of a transportation vehicle from different data sources including at least one sensor generating data and being arranged on the transportation vehicle and at least one data source providing data via vehicle-to-everything (V2X) data communication, when the program code is executed on a computer, a processor, a control module or a programmable hardware component, the method comprising:

capturing a first item of environmental information relating to the environment by the at least one sensor arranged on the transportation vehicle;

receiving a second item of environmental information relating to the environment from a transmitter separated from the transportation vehicle;

determining a first item of object information, together with a first item of meta information that includes information that identifies an object associated with the first item of object information and includes information for referencing to the first item of object information, from the captured first environmental information; and determining a second item of object information, together with a second item of meta information that includes information that identifies an object associated with the second item of object information and includes information for referencing to the second item of object information, from the received second environmental information;

comparing a tolerance range with a discrepancy between the first item of object information and the second item of object information; and associating the first meta information with the second meta information based on the comparison, and combining the data in a cooperative environmental model, wherein the first and second items of object information are linked together based on the association of the first and second meta information, wherein the linking of the information to one another based on the assignment of meta information respectively associated with the object information is performed such that the first and second meta information are stored in a database separate from an information database storing object information, and wherein the combination of the data in the cooperative environmental model combines redundant items of object information relating to the same object to reduce redundancies which increase a computing load needed to create or update the cooperative environmental model as part of controlled operation of the transportation vehicle in an automated manner whereby assignment of meta information is continuously updated based on newly received object information so as to update the cooperative environmental model continuously.

* * * * *